United States Patent
Zhu et al.

(10) Patent No.: US 10,009,836 B2
(45) Date of Patent: Jun. 26, 2018

(54) METHOD AND SYSTEM FOR DETERMINING DURATION OF RAPID ON/OFF STATE

(71) Applicant: Yulong Computer Telecommunication Scientific (Shenzhen) Co., Ltd., Shenzhen, Guangdong (CN)

(72) Inventors: Yajun Zhu, Guangdong (CN); Yunfei Zhang, Guangdong (CN); Yiqing Cao, Guangdong (CN); Chenlu Zhang, Guangdong (CN)

(73) Assignee: Nanchang Coolpad Intelligent Technology Company Limited, Nanchang, Jiangxi (CN)

( * ) Notice: Subject to any disclaimer, the term of this patent is extended or adjusted under 35 U.S.C. 154(b) by 62 days.

(21) Appl. No.: 15/400,268

(22) Filed: Jan. 6, 2017

(65) Prior Publication Data
US 2017/0118704 A1    Apr. 27, 2017

Related U.S. Application Data (63) Continuation of application No. PCT/CN2014/083489, filed on Jul. 31, 2014.

(51) Int. Cl.
*H04W 4/00* (2018.01)
*H04W 48/16* (2009.01)
(Continued)

(52) U.S. Cl.
CPC .......... *H04W 48/16* (2013.01); *H04L 5/0005* (2013.01); *H04L 5/0048* (2013.01); *H04W 16/32* (2013.01);
(Continued)

(58) Field of Classification Search
None
See application file for complete search history.

(56) References Cited

U.S. PATENT DOCUMENTS

| | | | |
|---|---|---|---|
| 2011/0134774 A1* | 6/2011 | Pelletier | H04W 52/365 370/252 |
| 2014/0133395 A1* | 5/2014 | Nam | H04B 7/0452 370/328 |

(Continued)

FOREIGN PATENT DOCUMENTS

| | | |
|---|---|---|
| CN | 103648112 A | 3/2014 |
| CN | 103874176 A | 6/2014 |
| WO | WO2014/098384 A | 6/2014 |

OTHER PUBLICATIONS

QUALCOMM Incorporated; "3GPP TSG-RAN WG1 #76, R1-140452"; Small cell on/off time reduction, Feb. 14, 2014; ISSN:URL:http://www.3gpp.org/ftp/tsg_ran/WG1_RL1/TSGRI_76Docs/section 2; 5 pages.

(Continued)

*Primary Examiner* — Anh-Vu Ly
(74) *Attorney, Agent, or Firm* — Young Basile Hanlon & MacFarlane, P.C.

(57) ABSTRACT

Methods and systems for determining the duration of a rapid on/off state include: when a micro-cell base station is a single sub frame-level on/off micro-cell base station, determining in real-time the on/off state of the micro-cell base station in order to determine the duration of the state of the micro-cell base station; and when the micro-cell base station is a multiple sub frame-level on/off micro-cell base station, by means or receiving a notification message sent by the micro-cell base station or a macro-cell base station, determining the duration of the state of the micro-cell base station.

20 Claims, 5 Drawing Sheets

(51) Int. Cl.
H04W 72/04 (2009.01)
H04L 5/00 (2006.01)
H04W 16/32 (2009.01)

(52) U.S. Cl.
CPC ..... *H04W 72/042* (2013.01); *H04W 72/0446* (2013.01)

(56) References Cited

U.S. PATENT DOCUMENTS

| | | | | |
|---|---|---|---|---|
| 2015/0049649 | A1* | 2/2015 | Zhu | H04L 5/0092 370/277 |
| 2015/0126206 | A1* | 5/2015 | Krishnamurthy | H04W 76/18 455/452.1 |
| 2015/0271738 | A1* | 9/2015 | Cheng | H04W 16/24 455/422.1 |
| 2015/0282080 | A1* | 10/2015 | Maattanen | H04W 52/0216 370/311 |
| 2015/0358899 | A1* | 12/2015 | Ko | H04W 72/042 370/252 |
| 2016/0234762 | A1* | 8/2016 | You | H04J 11/0056 370/328 |
| 2017/0005775 | A1* | 1/2017 | Cheng | H04L 5/0098 370/328 |
| 2017/0111217 | A1* | 4/2017 | Kim | H04L 41/08 370/328 |
| 2017/0295002 | A1* | 10/2017 | Chen | H04L 5/0048 370/328 |
| 2017/0311144 | A1* | 10/2017 | Chen | H04W 8/005 370/328 |

OTHER PUBLICATIONS

Ericsson: "Summary of proposed schemes for small cells on/off transition time reduction", 3GPP Draft; R1-142779, 3rd Generation Partnership Project (3GPP), Mobile Competence Centre; 650, Route Des Lucioles; F-06921 Sophia-Antipolis Cedex; France, vol. RAN WG1, No. Seoul, South Korea; May 19, 2014-May 23, 2014, Jul. 22, 2014 (Jul. 22, 2014), XP050815138, Retrieved from the Internet URL:http://www.3gpp.org/ftp/tsg_ran/WG1_RL1/TSGR1_77/Docs/ [retrieved on Jul. 22, 2014]; 2 Summary of proposals.

Alcatel-Lucent et al: "System design for transition time reduction for small cell on/off", 3GPP Draft; R1-142041 Small Cell OnOff_Procedure_Final, 3rd Generation Partnership Project (3GPP), Mobile Competence Centre; 650, Route Des Lucioles; F-06921 Sophia-Antipolis Cedex; France, vol. RAN WG1, No. Seoul, South Korea; May 19, 2014-May 23, 2014, May 18, 2014 (May 18, 2014), XP050789161, Retrieved from the Internet: URL:http://www.3gpp.org/ftp/Meetings_3GPP_SYNC/RANS/RANS/Docs/ [retrieved on May 18, 2014].

Texas Instruments: Necessary procedures for small cell on/off transition time reduction, 3GPP Draft; R1-140536, 3rd Generation Partnership Project (3GPP), Mobile Competence Centre; 650, Route Des Lucioles; F-06921 Sophia-Antipolis Cedex; France, vol. RAN WG1, No. Pragus, Czech Republic; Feb. 10, 2014-Feb. 14, 2014, Feb. 9, 2014 (Feb. 9, 2014), XP050736068, Retrieved from the Internet URL:http://www.3gpp.org/ftp/Meetings_3GPP_SYNC/RANS/RANS/Docs/ [retrieved on Feb. 9, 2014]; 2. Discussion.

Extended European Search Report dated Jan. 24, 2018 in corresponding EP Application No. 14899055.9.

* cited by examiner

METHOD AND SYSTEM FOR DETERMINING DURATION OF RAPID ON/OFF STATE

CROSS-REFERENCE TO RELATED APPLICATION(S)

This application is a continuation of International Application No. PCT/CN2014/083489, entitled "METHOD AND SYSTEM FOR DETERMINING DURATION OF RAPID ON/OFF STATE. AND TERMINAL", filed on Jul. 31, 2014, which disclosure is herein incorporated by reference.

TECHNICAL FIELD

The present disclosure relates to communication technology field, and particularly, relates to a method for determining the duration of a rapid on/off state of a micro-cell base station, and a system for determining the duration of a rapid on/off state of a micro-cell base station.

BACKGROUND

In current wireless communication system, in order to further improve network capacity, miniaturization of base stations and intensity of network nodes has become an inevitable choice. However, the intensity of network nodes is bound to bring mutual interference problems, and strong interference between nodes can greatly affect system performance.

In order to solve the interference problem among low power nodes, 3GPP (the 3rd Generation Partnership Project) has done a lot of standardization work. In R10/11 stage, for a scene where macro base stations and base stations with low power are working in the same frequency, an ABS (Almost Blank Sub-frame) method is introduced. Interference sources can configure ABS on certain sub-frames, and interfered nodes can schedule users that in its services and are seriously disturbed on sub-frames where ABS is configured by the interference sources. In the current R12 stage, a more intensive small cell (a low-power wireless access node, and can be understood as a micro-cell base station) deployment scenario is considered, and an on/off (in other words, switching) method of the small cell is introduced. Some small cells can be open or closed according to business changes or interference changes. This prevents interference among small cells, and meanwhile, improves the energy-efficient of the base station.

Currently, the energy saving method of the base station is time consuming, and it is unable to meet the needs of a scene of intensive small cell deployment. In R12 standardization discussion, it has been determined to introduce a concept of shorter on/off time. To achieve higher system performance, state switching time of small cells should be as short as possible, so as to improve spectral efficiency. Early in the discussion, a rapid on/off method of small cells has been proven to achieve optimum system performance; however, rapid on/off of small cells will affect the measurement and other acts of a terminal. After state information of a small cell (that is, the small cell is currently in "on" or "off" state) is known, the terminal further needs to know duration information of the current state of that small cell.

Thus, how to make the terminal know the duration of the rapid on/off state of a micro-cell base station becomes a technical problem to be solved.

SUMMARY

Based on at least one of the above problems, a new scheme is proposed to determine the rapid on/off state duration of a micro-cell base station such that at the same time being informed of the current on/off state of the micro-cell base station, the terminal can further learn the duration information of the current state of the micro-cell, thus avoid invalid detection of the terminal, and the power consumption of the terminal can be reduced.

In view of this, the present disclosure provides a method for determining the duration of a rapid on/off state of a micro-cell base station, including: when a micro-cell base station is a single sub-frame level on/off micro-cell base station, detecting in real-time an on/off state of the micro-cell base station so as to determine a state duration of the micro-cell base station; when the micro-cell base station is a multiple sub-frame level on/off micro-cell base station, determining the state duration of the micro-cell base station by receiving a notification message sent by the micro-cell base station or a macro-cell base station.

In this technical scheme, the single sub-frame level on/off micro-cell base station can be switched in a single sub-frame, and the multiple sub-frame level on/off micro-cell base station cannot be switched in a sub-frame. That is to say, for the multiple sub-frame level on/off micro-cell base station, after a state switching instruction is issued, a period of time will be continued until state switching is performed. Thus, for the single sub-frame level on/off micro-cell base station, the terminal can detect the on/off state of the micro-cell base station on each sub-frame so as to determine the state duration of the micro-cell base station. For the multiple sub-frame level on/off micro-cell base station, the terminal can detect a notification message sent by the micro-cell base station or the macro-cell base station so as to determine the current state and the state duration of the microcell base station, thus avoid invalid detection of the terminal, and the power consumption of the terminal can be reduced.

In the above technical scheme, the step of detecting in real-time the on/off state of the micro-cell base station so as to determine state duration of the micro-cell base station comprises: determining whether physical layer downlink control information sent by the macro-cell base station and/or the micro-cell base station is received on each sub-frame; if the physical layer downlink control information is received on any sub-frame, determining that the micro-cell base station is in "on" state on the any sub-frame, otherwise, determining that the micro-cell base station is in "off" state on the any sub-frame; determining the state duration of the micro-cell base station in accordance with the state of the micro-cell base station on each sub-frame.

In this technical scheme, for the single sub-frame level on/off micro-cell base station, by determining whether there is physical layer downlink control information sent by the micro-cell base station and/or the macro-cell base station on each sub-frame, the terminal can know the on/off state of the micro-cell base station on each sub-frame, and then determine the state duration of the micro-cell base station through the on/off state of the micro-cell base station on each sub-frame.

In the above-mentioned technical scheme, the physical layer downlink control information includes: physical layer downlink control information for cross-carrier scheduling or, physical layer downlink control information for public information transmission scheduling or, physical layer downlink control information for UE-specific transmission scheduling.

In the above-mentioned technical scheme, the step of detecting in real-time the on/off state of the micro-cell base station so as to determine state duration of the micro-cell base station includes: determining whether designated pilot information sent by the micro-cell base station is received on each sub-frame; if the designated pilot information is detected on any sub-frame, determining that the micro-cell base station is in "on" state on the any sub-frame, otherwise, determining that the micro-cell base station is in "off" state on the any sub-frame; determining the state duration of the micro-cell base station in accordance with the state of the micro-cell base station on each sub-frame.

In this technical scheme, by determining whether there is designated pilot information sent by the micro-cell base station on each sub-frame, the terminal can know the on/off state of the micro-cell base station on each sub-frame, and then determine the state duration of the micro-cell base station through the on/off state of the micro-cell base station on each sub-frame. Among which, the designated pilot information can be a current protocol version supported pilot type, such as PSS, SSS, CRS, CSI-S or other types of pilot. The designated pilot information is required to be notified to the terminal by the micro-cell base station or the macro-cell base station in advance.

In the above-mentioned technical scheme, the step of detecting in real-time the on/off state of the micro-cell base station so as to determine state duration of the micro-cell base station includes: determining whether designated pilot information sent by the micro-cell base station is detected on each sub-frame, and whether the each sub-frame is a sub-frame used to transmit a discovery signal; if the designated pilot information is detected on any sub-frame, and the any sub-frame is not a sub-frame used to transmit the discovery signal, determining that the micro-cell base station is in "on" state on the any sub-frame, otherwise, determining that the micro-cell base station is in "off" state on the any sub-frame; determining the state duration of the micro-cell base station in accordance with the state of the micro-cell base station on each sub-frame.

In this technical scheme, the discovery signal will be transmitted at a specified sub-frame location when the micro-cell base station is closed. Therefore, if the above-mentioned designated pilot information is detected on a sub-frame, and it is determined that this sub-frame is a sub-frame used to transmit the discovery signal, it will be determined that the micro-cell base station is closed. By determining whether the sub-frame used to transmit the above-mentioned designated pilot information is a sub-frame used to transmit the discovery signal, the accuracy of state judgment of the micro-cell base station can be improved.

In the above-mentioned technical scheme, the micro-cell base station or the macro-cell base station is configured to send information of a sub-frame used to transmit the discovery signal via radio resource control signaling, media access control signaling, or physical layer signaling.

In the above-mentioned technical scheme, the micro-cell base station or the macro-cell base station sends configuration information of the designated pilot information via radio resource control signaling, media access control signaling, or physical layer signaling; the configuration information includes: time-frequency location of the designated pilot information and the type of the designated pilot information.

In the above-mentioned technical scheme, the step of determining the state duration of the micro-cell base station by receiving the notification message sent by the micro-cell base station or the macro-cell base station includes: before a state switching instruction of the micro-cell base station is received from the micro-cell base station or the macro-cell base station, receiving a start time point at which state switching is performed according to the state switching instruction of the micro-cell base station received from the micro-cell base station or the macro-cell base station, and receiving the state duration of the micro-cell base station after state switching.

In this technical scheme, for the multiple sub-frame level on/off micro-cell base station, the terminal can know the on/off state and the state duration of the micro-cell base station by receiving the start time point and the state duration of state switching of the micro-cell base station sent by the micro-cell base station or the macro-cell base station.

In the above-mentioned technical scheme, the step of determining the state duration of the micro-cell base station by receiving the notification message sent by the micro-cell base station or the macro-cell base station includes: receiving a state switching instruction of the micro-cell base station sent by the micro-cell base station or the macro-cell base station; parsing the state switching instruction to determine a start time point at which state switching of the micro-cell base station will be performed and the state duration of the micro-cell base station after state switching.

Instead of receiving the start time point and the duration of state switching sent by the micro-cell base station or the macro-cell base station first and then receiving the state switching instruction, in this technical scheme, the start time point and the duration are contained in the state switching instruction and are sent simultaneously.

In the above-mentioned technical scheme, the micro-cell base station or the macro-cell base station can send the state switching instruction via radio resource control signaling, media access control signaling, or physical layer signaling.

In the above-mentioned technical scheme, the step of determining the state duration of the micro-cell base station by receiving the notification message sent by the micro-cell base station or the macro-cell base station includes: receiving a state switching instruction of the micro-cell base station sent by the micro-cell base station or the macro-cell base station; determining the location of a second sub-frame where state switching of the micro-cell base station will be performed, according to the location of a first sub-frame where a state switching instruction received is located and a predefined first adjustment value; determining the location of a fourth sub-frame where state switching of the micro-cell base station will be performed, according to the location of a third sub-frame where a state switching instruction sent again is located and a predefined second adjustment value, upon reception of the state switching instruction sent again by the micro-cell base station or the macro-cell base station; determining the state duration according to the location of the second sub-frame and the location of the fourth sub-frame.

In this technical scheme, instead of informing the terminal of the duration of a new state of the micro-cell base station, the micro-cell base station or the macro-cell base station may also inform the terminal of the duration of the new state of the micro-cell base station implicitly via a state switching instruction. Specifically, upon receiving on sub-frame N, by the terminal, a state switching instruction indicating "on" state, it is considered that the micro-cell base station will enter into "on" state on sub-frame N+X1; upon receiving on sub-frame N+X1+X2, by the terminal, a state switching instruction indicating "off" state, it is considered that the micro-cell base station will enter into "off" state on sub-frame N+X1+X2+X3, thus the state duration of the micro-cell base station can be calculated by the terminal. Wherein the state switching instruction can be sent by the micro-cell base station or the macro-cell base station via radio resource control signaling, media access control signaling, or physical layer signaling.

In the above-mentioned technical scheme, the micro-cell base station or the macro-cell base station can send the first adjustment value and the second adjustment value via radio resource control signaling, media access control signaling, or physical layer signaling.

According to another aspect of the present disclosure, it is provided a system for determining the duration of a rapid on/off state of a micro-cell base station. The system includes: a detecting unit, configured to detect in real-time an on/off state of a micro-cell base station if the micro-cell base station is a single sub-frame level on/off micro-cell base station; a receiving unit, configured to receive a notification message sent by the micro-cell base station or a macro-cell base station when the micro-cell base station is a multiple sub-frame level on/off micro-cell base station; a processing unit, configured to determine a state duration of the micro-cell base station according to the on/off state of the micro-cell base station detected in real-time by the detecting unit or the notification message sent by the micro-cell base station or the macro-cell base station and received by the receiving unit.

In this technical scheme, the single sub-frame level on/off micro-cell base station can be switched on each sub-frame, and the multiple sub-frame level on/off micro-cell base station cannot be switched in a sub-frame. That is to say, for the multiple sub-frame level on/off micro-cell base station, after a state switching instruction is issued, a period of time will be continued until state switching is performed. Thus, for the single sub-frame level on/off micro-cell base station, the terminal can detect the on/off state of the micro-cell base station on each sub-frame so as to determine the state duration of the micro-cell base station. For the multiple sub-frame level on/off micro-cell base station, the terminal can detect a notification message sent by the micro-cell base station or the macro-cell base station so as to determine the current state and the state duration of the microcell base station.

In the above-mentioned technical scheme, the processing unit includes: a judging unit, configured to judge whether physical layer downlink control information sent by the macro-cell base station and/or the micro-cell base station is received on each sub-frame; and it is determined that the micro-cell base station is in "on" state on any sub-frame if the physical layer downlink control information is received on the any sub-frame; otherwise, it is determined that the micro-cell base station is in "off" state on the any sub-frame; a determining unit, configured to determine the state duration of the micro-cell base station in accordance with the state of the micro-cell base station on each sub-frame.

In this technical scheme, for the single sub-frame level on/off micro-cell base station, by determining whether there is physical layer downlink control information sent by the micro-cell base station and/or the macro-cell base station on each sub-frame, the terminal can know the on/off state of the micro-cell base station on each sub-frame, and then determine the state duration of the micro-cell base station through the on/off state of the micro-cell base station on each sub-frame.

In the above-mentioned technical scheme, the physical layer downlink control information includes: physical layer downlink control information for cross-carrier scheduling or, physical layer downlink control information for public information transmission scheduling or, physical layer downlink control information for UE-specific transmission scheduling.

In the above-mentioned technical scheme, the processing unit includes: a judging unit, configured to judge whether designated pilot information sent by the micro-cell base station is received on each sub-frame, and determine that the micro-cell base station is in "on" state on any sub-frame if the designated pilot information is detected on the any sub-frame, otherwise, determine that the micro-cell base station is in "off" state on the any sub-frame; a determining unit, configured to determine the state duration of the micro-cell base station in accordance with the state of the micro-cell base station on each sub-frame.

In this technical scheme, by determining whether there is designated pilot information sent by the micro-cell base station on each sub-frame, the terminal can know the on/off state of the micro-cell base station on each sub-frame, and then determine the state duration of the micro-cell base station through the on/off state of the micro-cell base station on each sub-frame. Among which, the designated pilot information can be a current protocol version supported pilot type, such as PSS, SSS, CRS, CSI-S or other types of pilot. The designated pilot information is required to be notified to the terminal by the micro-cell base stations or the macro-cell base station in advance.

In the above-mentioned technical scheme, the processing unit includes: a judging unit, configured to judge whether designated pilot information sent by the micro-cell base station is detected on each sub-frame, and whether the each sub-frame is a sub-frame used to transmit a discovery signal; if the designated pilot information is detected on any sub-frame and the any sub-frame is not a sub-frame used to transmit the discovery signal, the judging unit determines that the micro-cell base station is in "on" state on the any sub-frame, otherwise, the judging unit determines that the micro-cell base station is in "off" state on the any sub-frame; a determining unit, configured to determine the state duration of the micro-cell base station in accordance with the state of the micro-cell base station on each sub-frame.

In this technical scheme, the discovery signal will be transmitted at a specified sub-frame location when the micro-cell base station is closed. Therefore, if the above-mentioned designated pilot information is detected on a sub-frame, and it is determined that this sub-frame is a sub-frame used to transmit the discovery signal, it will be determined that the micro-cell base station is closed. By determining whether the sub-frame used to transmit the above-mentioned designated pilot information is a sub-frame used to transmit the discovery signal, the accuracy of state judgment of the micro-cell base station can be improved.

In the above-mentioned technical scheme, the micro-cell base station or the macro-cell base station is configured to send information of a sub-frame used to transmit the discovery signal via radio resource control signaling, media access control signaling, or physical layer signaling.

In the above-mentioned technical scheme, the micro-cell base station or the macro-cell base station sends configuration information of the designated pilot information via radio resource control signaling, media access control signaling, or physical layer signaling, the configuration information includes: time-frequency location of the designated pilot information and the type of the designated pilot information.

In the above-mentioned technical scheme, the receiving unit is configured to receive: a start time point at which state switching will be performed according to the state switching instruction of the micro-cell base station received from the micro-cell base station or the macro-cell base station, and the state duration of the micro-cell base station after state switching.

In this technical scheme, for the multiple sub-frame level on/off micro-cell base station, the terminal can know the on/off state and the state duration of the micro-cell base station by receiving the start time point and the duration of state switching of the micro-cell base station sent by the micro-cell base station or the macro-cell base station.

In the above-mentioned technical scheme, the receiving unit is configured to receive a state switching instruction of the micro-cell base station sent by the micro-cell base station or the macro-cell base station; the processing unit further comprises: a parsing unit, configured to parse the state switching instruction; a determining unit, configured to determine a start time point at which state switching of the micro-cell base station is performed and the state duration of the micro-cell base station after state switching according to a parsing result of the parsing unit.

Instead of receiving the start time point and the duration of state switching sent by the micro-cell base station or the macro-cell base station first and then receiving the state switching instruction, in this technical scheme, the start time point and the duration are contained in the state switching instruction and are sent simultaneously.

In the above-mentioned technical scheme, the micro-cell base station or the macro-cell base station is configured to send the state switching instruction via radio resource control signaling, media access control signaling, or physical layer signaling.

In the above-mentioned technical scheme, the receiving unit is configured to receive a state switching instruction of the micro-cell base station sent by the micro-cell base station or the macro-cell base station; the processing unit is configured to determine the location of a second sub-frame where state switching of the micro-cell base station will be performed, according to the location of a first sub-frame where a state switching instruction received by the receiving unit is located and a predefined first adjustment value, and determine the location of a fourth sub-frame where state switching of the micro-cell base station is performed, according to the location of a third sub-frame where a state switching instruction sent again is located and a predefined second adjustment value, when the state switching instruction sent again by the micro-cell base station or the macro-cell base station is received by the receiving unit, and determine the state duration according to the location of the second sub-frame and the location of the fourth sub-frame.

In this technical scheme, instead of informing the terminal of the duration of a new state of the micro-cell base station, the micro-cell base station or the macro-cell base station may also inform the terminal of the duration of the new state of the micro-cell base station implicitly via a state switching instruction. Specifically, upon receiving on sub-frame N, by the terminal, a state switching instruction indicating "on" state, it is considered that the micro-cell base station will enter into "on" state on sub-frame N+X1; upon receiving on sub-frame N+X1+X2, by the terminal, a state switching instruction indicating "off" state, it is considered that the micro-cell base station will enter into "off" state in sub-frame N+X1+X2+X3, thus the state duration of the micro-cell base station can be calculated by the terminal. Wherein the state switching instruction can be sent by the micro-cell base station or the macro-cell base station via radio resource control signaling, media access control signaling, or physical layer signaling.

In the above-mentioned technical scheme, the micro-cell base station or the macro-cell base station sends the first adjustment value and the second adjustment value via radio resource control signaling, media access control signaling, or physical layer signaling.

According to another aspect of the present disclosure, it is provided a terminal, comprising the system for determining the duration of a rapid on/off state of a micro-cell base station in any of the above mentioned technical scheme.

With the aid of the above mentioned technical schemes, at the same time of being informed the current on/off state of the micro-cell base station, the terminal can further learn the duration information of the current state of the micro-cell base station, thus avoid invalid detection of the terminal, and the power consumption of the terminal can be reduced.

DETAILED DESCRIPTION

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

In the following description, numerous specific details are set forth in order to fully understand the present disclosure; however, the present disclosure can be implemented in other manners different from those described herein, therefore, the scope of the present disclosure is not limited to the examples disclosed below specifically.

Figure 1:
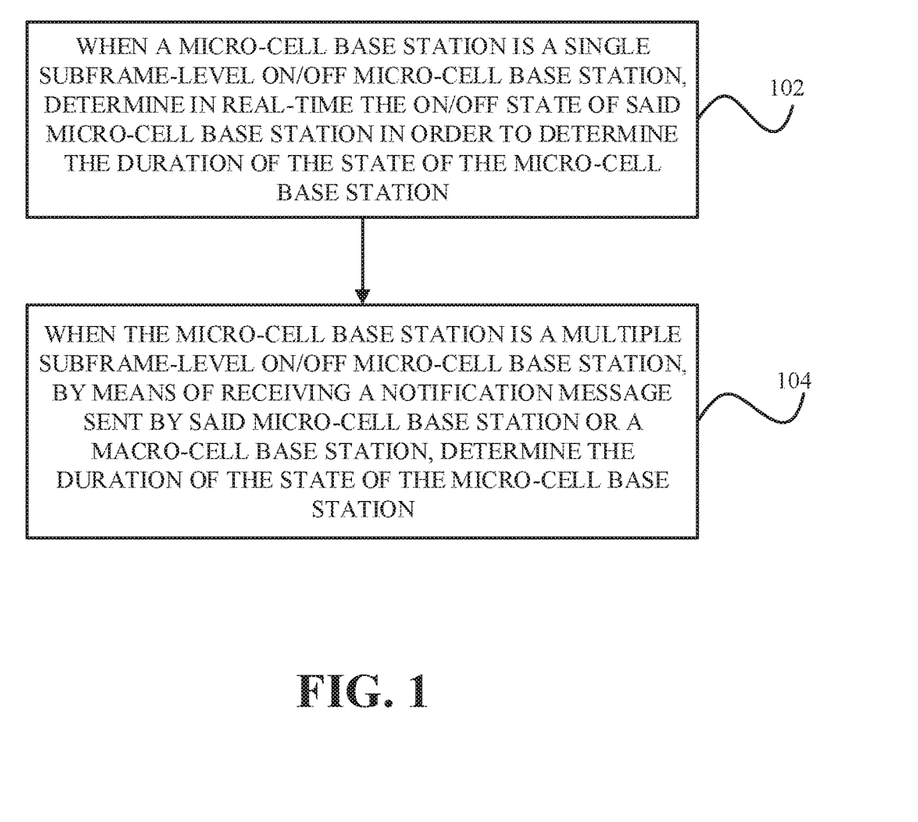
FIG. 1 is a schematic flow chart illustrating a method for determining the duration of a rapid on/off state of a micro-cell base station according to an implementation of the present disclosure.

FIG. 1 is a schematic flow chart illustrating a method for determining the duration of a rapid on/off state of a micro-cell base station according to an implementation of the present disclosure.

As shown in FIG. 1, the method for determining the duration of a rapid on/off state of a micro-cell base station, comprising: step 102, when a micro-cell base station is a single sub-frame level on/off micro-cell base station, detecting in real-time an on/off state of the micro-cell base station so as to determine state duration of the micro-cell base station; step 104, when the micro-cell base station is a multiple sub-frame level on/off micro-cell base station, determining the state duration of the micro-cell base station by receiving a notification message sent by the micro-cell base station or a macro-cell base station.

In this technical scheme, the single sub-frame level on/off micro-cell base station can be switched in a single sub-frame, and the multiple sub-frame level on/off micro-cell base station cannot be switched in a sub-frame. That is to say, for the multiple sub-frame level on/off micro-cell base station, after a state switching instruction is issued, a period of time will be continued until state switching is performed. Thus, for the single sub-frame level on/off micro-cell base station, the terminal can detect the on/off state of the micro-cell base station on each sub-frame so as to determine the state duration of the micro-cell base station. For the multiple sub-frame level on/off micro-cell base station, the terminal can detect a notification message sent by the micro-cell base station or the macro-cell base station so as to determine the current state and the state duration of the microcell base station.

In the above technical scheme, the step of detecting in real-time the on/off state of the micro-cell base station so as to determine state duration of the micro-cell base station comprises: determining whether physical layer downlink control information sent by the macro-cell base station and/or the micro-cell base station is received on each sub-frame; if the physical layer downlink control information is received on any sub-frame, determining that the micro-cell base station is in "on" state on the any sub-frame, otherwise, determining that the micro-cell base station is in "off" state on the any sub-frame; determining the state duration of the micro-cell base station in accordance with the state of the micro-cell base station on each sub-frame.

In this technical scheme, for the single sub-frame level on/off micro-cell base station, by determining whether there is physical layer downlink control information sent by the micro-cell base station and/or the macro-cell base station on each sub-frame, the terminal can know the on/off state of the micro-cell base station on each sub-frame, and then determine the state duration of the micro-cell base station through the on/off state of the micro-cell base station on each sub-frame.

In the above-mentioned technical scheme, the physical layer downlink control information includes: physical layer downlink control information for cross-carrier scheduling or, physical layer downlink control information for public information transmission scheduling or, physical layer downlink control information for UE-specific transmission scheduling.

In the above-mentioned technical scheme, the step of detecting in real-time the on/off state of the micro-cell base station so as to determine state duration of the micro-cell base station includes: determining whether designated pilot information sent by the micro-cell base station is received on each sub-frame; if the designated pilot information is detected on any sub-frame, determining that the micro-cell base station is in "on" state on the any sub-frame, otherwise, determining that the micro-cell base station is in "off" state on the any sub-frame; determining the state duration of the micro-cell base station in accordance with the state of the micro-cell base station on each sub-frame.

In this technical scheme, by determining whether there is designated pilot information sent by the micro-cell base station on each sub-frame, the terminal can know the on/off state of the micro-cell base station on each sub-frame, and then determine the state duration of the micro-cell base station through the on/off state of the micro-cell base station on each sub-frame. Among which, the designated pilot information can be a current protocol version already supported pilot type, such as PSS, SSS, CRS, CSI-S or other types of pilot. The designated pilot information is required to be notified to the terminal by the micro-cell base station or the macro-cell base station in advance.

In the above-mentioned technical scheme, the step of detecting in real-time the on/off state of the micro-cell base station so as to determine the state duration of the micro-cell base station includes: determining whether designated pilot information sent by the micro-cell base station is detected on each sub-frame, and whether the each sub-frame is a sub-frame used to transmit discovery signal; if the designated pilot information is detected on any sub-frame, and the any sub-frame is not a sub-frame used to transmit the discovery signal, determining that the micro-cell base station is in "on" state on the any sub-frame, otherwise, determining that the micro-cell base station is in "off" state on the any sub-frame; determining the state duration of the micro-cell base station in accordance with the state of the micro-cell base station on each sub-frame.

In this technical scheme, the discovery signal will be transmitted at a specified sub-frame location when the micro-cell base station is closed. Therefore, if the above-mentioned designated pilot information is detected on a sub-frame, and it is determined that this sub-frame is a sub-frame used to transmit the discovery signal, it will be determined that the micro-cell base station is closed. By determining whether the sub-frame used to transmit the above-mentioned designated pilot information is a sub-frame used to transmit the discovery signal, the accuracy of state judgment of the micro-cell base station can be improved.

In the above-mentioned technical scheme, the micro-cell base station or the macro-cell base station is configured to send information of a sub-frame used to transmit the discovery signal via radio resource control signaling, media access control signaling, or physical layer signaling.

In the above-mentioned technical scheme, the micro-cell base station or the macro-cell base station sends configuration information of the designated pilot information via radio resource control signaling, media access control signaling, or physical layer signaling, the configuration information includes: time-frequency location of the designated pilot information and the type of the designated pilot information.

In the above-mentioned technical scheme, the step of determining the state duration of the micro-cell base station by receiving the notification message sent by the micro-cell base station or the macro-cell base station includes: before a state switching instruction of the micro-cell base station is received from the micro-cell base station or the macro-cell base station, receiving a start time point at which state switching will be performed according to the state switching instruction of the micro-cell base station received from the micro-cell base station or the macro-cell base station, and receiving the state duration of the micro-cell base station after state switching.

In this technical scheme, for the multiple sub-frame level on/off micro-cell base station, the terminal can know the on/off state and the state duration of the micro-cell base station by receiving the start time point and the duration of state switching of the micro-cell base station sent by the micro-cell base station or the macro-cell base station.

In the above-mentioned technical scheme, the step of determining the state duration of the micro-cell base station by receiving the notification message sent by the micro-cell base station or the macro-cell base station includes: receiving a state switching instruction of the micro-cell base station sent by the micro-cell base station or the macro-cell base station; parsing the state switching instruction to determine the start time point at which state switching of the micro-cell base station will be performed and the state duration of the micro-cell base station after state switching.

Different from the above technical scheme in which the start time point and the duration of state switching sent by the micro-cell base station or the macro-cell base station is received first and then the state switching instruction is received, in this technical scheme, the start time point and the duration are contained in the state switching instruction and are sent simultaneously.

In the above-mentioned technical scheme, the micro-cell base station or the macro-cell base station sends the state switching instruction via radio resource control signaling, media access control signaling, or physical layer signaling.

In the above-mentioned technical scheme, the step of determining the state duration of the micro-cell base station by receiving the notification message sent by the micro-cell base station or the macro-cell base station includes: receiving a state switching instruction of the micro-cell base station sent by the micro-cell base station or the macro-cell base station; determining the location of a second sub-frame where state switching of the micro-cell base station will be performed, according to the location of a first sub-frame where a state switching instruction received is located and a predefined first adjustment value; determining the location of a fourth sub-frame where state switching of the micro-cell base station will be performed, according to the location of a third sub-frame where a state switching instruction sent again is located and a predefined second adjustment value, upon reception of the state switching instruction sent again by the micro-cell base station or the macro-cell base station; determining the state duration according to the location of the second sub-frame and the location of the fourth sub-frame.

In this technical scheme, instead of informing the terminal of the duration of a new state of the micro-cell base station, the micro-cell base station or the macro-cell base station may also inform the terminal of the duration of the new state of the micro-cell base station implicitly via a state switching instruction. Specifically, upon receiving on sub-frame N, by the terminal, a state switching instruction indicating "on" state, it is considered that the micro-cell base station will enter into "on" state on sub-frame N+X1; upon receiving on sub-frame N+X1+X2, by the terminal, a state switching instruction indicating "off" state, it is considered that the micro-cell base station will enter into "off" state on sub-frame N+X1+X2+X3, thus the state duration of the micro-cell base station can be calculated by the terminal. Wherein the state switching instruction can be sent by the micro-cell base station or the macro-cell base station via radio resource control signaling, media access control signaling, or physical layer signaling.

In the above-mentioned technical scheme, the micro-cell base station or the macro-cell base station sends the first adjustment value and the second adjustment value via radio resource control signaling, media access control signaling, or physical layer signaling.

Figure 2:
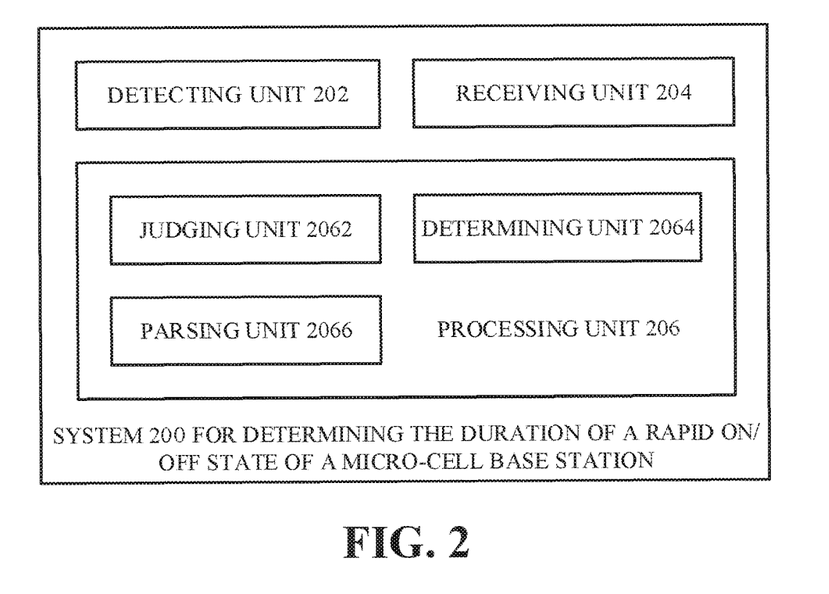
FIG. 2 is a schematic block diagram illustrating a system for determining the duration of a rapid on/off state of a micro-cell base station according to an implementation of the present disclosure.

FIG. 2 is a schematic block diagram illustrating a system for determining the duration of a rapid on/off state of a micro-cell base station according to an implementation of the present disclosure.

As shown in FIG. 2, the system for determining the duration of a rapid on/off state of a micro-cell base station according to an implementation of the present disclosure, including: a detecting unit 202, configured to detect in real-time an on/off state of a micro-cell base station when the micro-cell base station is a single sub-frame level on/off micro-cell base station; a receiving unit 204, configured to receive a notification message sent by the micro-cell base station or a macro-cell base station when the micro-cell base station is a multiple sub-frame level on/off micro-cell base station; a processing unit 206, configured to determine state duration of the micro-cell base station according to the on/off state of the micro-cell base station detected in real-time by the detecting unit 202 or the notification message sent by the micro-cell base station or the macro-cell base station and received by the receiving unit 204.

In this technical scheme, the single sub-frame level on/off micro-cell base station can be switched on each sub-frame, and the multiple sub-frame level on/off micro-cell base station cannot be switched in a sub-frame. That is to say, for the multiple sub-frame level on/off micro-cell base station, after a state switching instruction is issued, a period of time will be continued until state switching is performed. Thus, for the single sub-frame level on/off micro-cell base station, the terminal can detect the on/off state of the micro-cell base station on each sub-frame so as to determine the state duration of the micro-cell base station. For the multiple sub-frame level on/off micro-cell base station, the terminal can detect a notification message sent by the micro-cell base station or the macro-cell base station so as to determine the current state and the state duration of the microcell base station.

In the above-mentioned technical scheme, the processing unit 206 includes: a judging unit 2062, configured to judge whether physical layer downlink control information sent by the macro-cell base station and/or the micro-cell base station is received on each sub-frame; and is the judging unit 2062 determines that the micro-cell base station is in "on" state on the any sub-frame if the physical layer downlink control information is received on any sub-frame; otherwise, the judging unit 2062 determines that the micro-cell base station is in "off" state on the any sub-frame; a determining unit 2064, configured to determine the state duration of the micro-cell base station in accordance with the state of the micro-cell base station on each sub-frame.

In this technical scheme, for the single sub-frame level on/off micro-cell base station, by determining whether there is physical layer downlink control information sent by the micro-cell base station and/or the macro-cell base station on each sub-frame, the terminal can know the on/off state of the micro-cell base station on each sub-frame, and then determine the state duration of the micro-cell base station through the on/off state of the micro-cell base station on each sub-frame.

In the above-mentioned technical scheme, the physical layer downlink control information includes: physical layer downlink control information for cross-carrier scheduling or, physical layer downlink control information for public information transmission scheduling or, physical layer downlink control information for UE-specific transmission scheduling.

In the above-mentioned technical scheme, the processing unit 206 includes: a judging unit 2062, configured to judge whether designated pilot information sent by the micro-cell base station is received on each sub-frame; the judging unit 2062 determines that the micro-cell base station is in "on" state on any sub-frame if the designated pilot information is detected on the any sub-frame, otherwise, the judging unit 2062 determines that the micro-cell base station is in "off" state on the any sub-frame; a determining unit 2064, configured to determine the state duration of the micro-cell base station in accordance with the state of the micro-cell base station on each sub-frame.

In this technical scheme, by determining whether there is designated pilot information sent by the micro-cell base station on each sub-frame, the terminal can know the on/off state of the micro-cell base station on each sub-frame, and then determine the state duration of the micro-cell base station through the on/off state of the micro-cell base station on each sub-frame. Among which, the designated pilot information can be a current protocol version supported pilot type, such as PSS, SSS, CRS, CSI-S or other types of pilot. The designated pilot information is required to be notified to the terminal by the micro-cell base stations or the macro-cell base station in advance.

In the above-mentioned technical scheme, the processing unit 206 includes: a judging unit 2062, configured to judge whether designated pilot information sent by the micro-cell base station is detected on each sub-frame, and whether the each sub-frame is a sub-frame used to transmit a discovery signal; if the designated pilot information is detected on any sub-frame, and the any sub-frame is not a sub-frame used to transmit the discovery signal, the judging unit 2062 determines that the micro-cell base station is in "on" state on the any sub-frame, otherwise, the judging unit 2062 determines that the micro-cell base station is in "off" state on the any sub-frame; a determining unit 2064, configured to determine the state duration of the micro-cell base station in accordance with the state of the micro-cell base station on each sub-frame.

In this technical scheme, the discovery signal will be transmitted at a specified sub-frame location when the micro-cell base station is closed. Therefore, if the above-mentioned designated pilot information is detected on a sub-frame, and it is determined that this sub-frame is a sub-frame used to transmit the discovery signal, it will be determined that the micro-cell base station is closed. By determining whether the sub-frame used to transmit the above-mentioned designated pilot information is a sub-frame used to transmit the discovery signal, the accuracy of state judgment of the micro-cell base station can be improved.

In the above-mentioned technical scheme, the micro-cell base station or the macro-cell base station is configured to send information of a sub-frame used to transmit the discovery signal via radio resource control signaling, media access control signaling, or physical layer signaling.

In the above-mentioned technical scheme, the micro-cell base station or the macro-cell base station can send configuration information of the designated pilot information via radio resource control signaling, media access control signaling, or physical layer signaling, the configuration information includes: time-frequency location of the designated pilot information and the type of the designated pilot information.

In the above-mentioned technical scheme, the receiving unit is configured to: receive a start time point at which state switching will be performed according to the state switching instruction of the micro-cell base station received from the micro-cell base station or the macro-cell base station, and receive duration of the micro-cell base station after state switching.

In this technical scheme, for the multiple sub-frame level on/off micro-cell base station, the terminal can know the on/off state and the state duration of the micro-cell base station by receiving the start time point and the duration of state switching of the micro-cell base station sent by the micro-cell base station or the macro-cell base station.

In the above-mentioned technical scheme, the receiving unit 204 is configured to: receive a state switching instruction of the micro-cell base station sent by the micro-cell base station or the macro-cell base station; the processing unit 206 further comprises: a parsing unit 2066, configured to parse the state switching instruction; a determining unit 2064, configured to determine a start time point at which state switching of the micro-cell base station will be performed and the state duration of the micro-cell base station after state switching according to a parsing result of the parsing unit 2066.

Instead of receiving the start time point and the duration of state switching sent by the micro-cell base station or the macro-cell base station first and then receiving the state switching instruction, in this technical scheme, the start time point and the duration are contained in the state switching instruction and are sent simultaneously.

In the above-mentioned technical scheme, the micro-cell base station or the macro-cell base station sends the state switching instruction via radio resource control signaling, media access control signaling, or physical layer signaling.

In the above-mentioned technical scheme, the receiving unit 204 is configured to receive a state switching instruction of the micro-cell base station sent by the micro-cell base station or the macro-cell base station; the processing unit 206 is configured to: determine the location of a second sub-frame where state switching of the micro-cell base station will be performed, according to the location of a first sub-frame where a state switching instruction received by the receiving unit 204 is located and a predefined first adjustment value; and determine the location of a fourth sub-frame where state switching of the micro-cell base station will be performed, according to the location of a third sub-frame where a state switching instruction sent again is located and a predefined second adjustment value, upon receiving, by the receiving unit 204, the state switching instruction sent again by the micro-cell base station or the macro-cell base station, and determine the state duration according to the location of the second sub-frame and the location of the fourth sub-frame.

In this technical scheme, instead of informing the terminal of the duration of a new state of the micro-cell base station, the micro-cell base station or the macro-cell base station may also inform the terminal of the duration of the new state of the micro-cell base station implicitly via a state switching instruction. Specifically, upon receiving on sub-frame N, by the terminal, a state switching instruction indicating "on" state, it is considered that the micro-cell base station will enter into "on" state on sub-frame N+X1; upon receiving on sub-frame N+X1+X2, by the terminal, a state switching instruction indicating "off" state, it is considered that the micro-cell base station will enter into "off" state in sub-frame N+X1+X2+X3, thus the state duration of the micro-cell base station can be calculated by the terminal. Wherein the state switching instruction can be sent by the micro-cell base station or the macro-cell base station via radio resource control signaling, media access control signaling, or physical layer signaling.

In the above-mentioned technical scheme, the micro-cell base station or the macro-cell base station sends the first adjustment value and the second adjustment value via radio resource control signaling, media access control signaling, or physical layer signaling.

Technical schemes of the present disclosure will be described below in detail in conjunction with FIGS. 3 and 4.

In order to better illustrate the technical schemes of the present disclosure, assuming there is a scenario as follows:

(1) a terminal always has a cell connection so as to ensure mobility.

(2) the terminal has Carrier Aggregation (CA) or Dual Connectivity (DC) capability, and a small cell has been allocated to the terminal as a small cell (Scell) or Secondary Cell Group (SCG).

Figure 3:
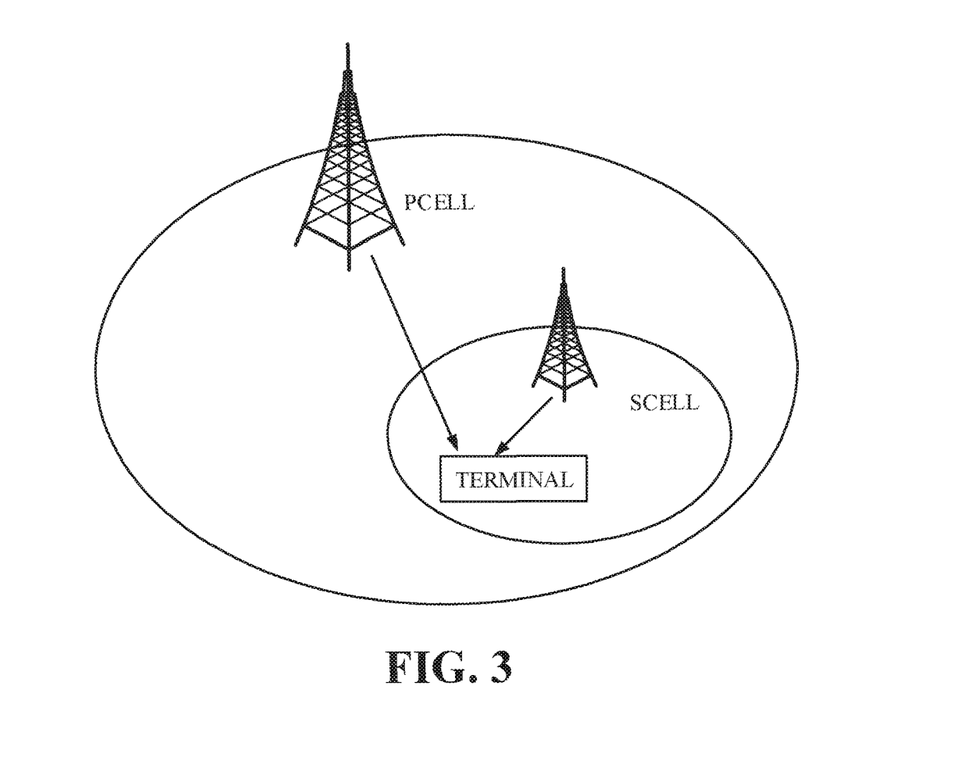
FIG. 3 is a schematic structure diagram illustrating a system for determining the duration of a rapid on/off state of a micro-cell base station according to an implementation of the present disclosure.

As shown in FIG. 3. Macrocell (macro-cell) is one Pcell (Primary cell) of the terminal, and is used to ensure the connection in the movement of the terminal. It should be noted that in FIG. 3, the macro-cell is just an example of Pcell; based on the same method, the macro-cell can also be a Scell. The small cell used as Scell can enhance the data rate of the terminal. This can be achieved by a Scell configuration of a CA or DC mechanism.

As to the problem of how can the terminal know the rapid on/off state duration of a micro-cell base station, different approaches are provided with respect to the single sub-frame level on/off micro-cell base station and the multiple sub-frame level on/off micro-cell base station, which will be described below in detail respectively:

(1) On/Off State Duration of a Single Sub-Frame Level on/Off Based Small Cell

For this solution, a small cell supporting dynamic on/off operation (namely, single sub-frame level on/off small cell) can change its state on any frame, that is, the small cell can switch from "on" state to "off" state or from "off" state to "on" state on any frame. In order to realize this scheme, the present disclosure proposes the following methods:

Method 1: inform the terminal of the state of the small cell via scheduling signaling in Pcell used for cross-carrier scheduling or public information transmission. If the scheduling signaling from Pcell used for cross-carrier scheduling or public information transmission is received by the terminal on the current sub-frame, it will be considered that Scell is in "on" state on the current sub-frame; in like manner, if the scheduling signaling from Pcell used for cross-carrier scheduling or public information transmission is not received by the terminal on the current sub-frame, it will be considered that Scell is in "off" state on the current sub-frame.

Based on this method, the terminal activated only needs to detect scheduling information on Pcell on each sub-frame.

Method 2: the terminal determines the current state of Scell on the current sub-frame by detecting scheduling information on Scell. If the scheduling information from Scell is received by the terminal on the current sub-frame, it will be considered that Scell is in "on" state on the current sub-frame; in like manner, if the scheduling information from Scell is not received by the terminal on the current sub-frame, it will be considered that Scell is in "off" state on the current sub-frame. It should be noted that, the scheduling information can be scheduling information for scheduling individual user transmission or for scheduling multiple users.

Based on such a method, the terminal activated needs to detect scheduling information on both Pcell and Scell on each sub-frame.

Method 3: the terminal determines the current state of Scell on the current sub-frame by detecting pilot information on Scell. If it is detected that there is some pilot transmission on Scell on the current sub-frame, it will be considered that Scell is in "on" state on the current sub-frame; similarly, if it is detected that there is no pilot transmission on Scell on the current sub-frame, it will be considered that Scell is in "off" state on the current sub-frame.

It should be noted that in the method described above, the pilot type to be detected by the terminal is predefined, the pilot type can be those supported by the current protocol version, such as PSS (Packet Switching Stream), SSS (Secondary Synchronization Signal), CRS (Cell Reference Signal), CSI-RS (Channel State Information Resource Schedule), or a new pilot type.

In addition, since DRS (Dedicated Reference Signal) transmission in "off" state is introduced in Rel-12 under small cell on/off mechanism, the sub-frame location of DRS transmission is informed to the terminal in advance. Thus the terminal has to determine whether the current sub-frame is a sub-frame for DRS transmission when detecting pilot. In one implementation of the method, if it is detected that, by the terminal, there is some pilot transmission on Scell on the current sub-frame and it is determined that, by the terminal, the current sub-frame is a sub-frame for DRS transmission, it will be determined that Scell is in "off" state on the current sub-frame even if the pilot transmission has being detected by the terminal.

Based on such a method, the terminal activated is required to detect whether there is pilot transmission on Scell on each sub-frame.

(2) On/Off State Duration of a Multiple Sub-Frame Level on/Off Based Small Cell

In this scheme, the on/off state of a small cell cannot be switched dynamically in any single sub-frame. In order to realize this scheme, the following methods are proposed in the present disclosure:

Method 1: Pcell or Scell notifies the terminal via RRC (Radio Resource Control) signaling, MAC (Medium Access Control) CE (Control Element), or physical layer signaling that, the duration of a new state of Scell after a state switching instruction is received. Additionally, a start time point of Scell state switching is also required to be informed to the terminal.

Figure 4:
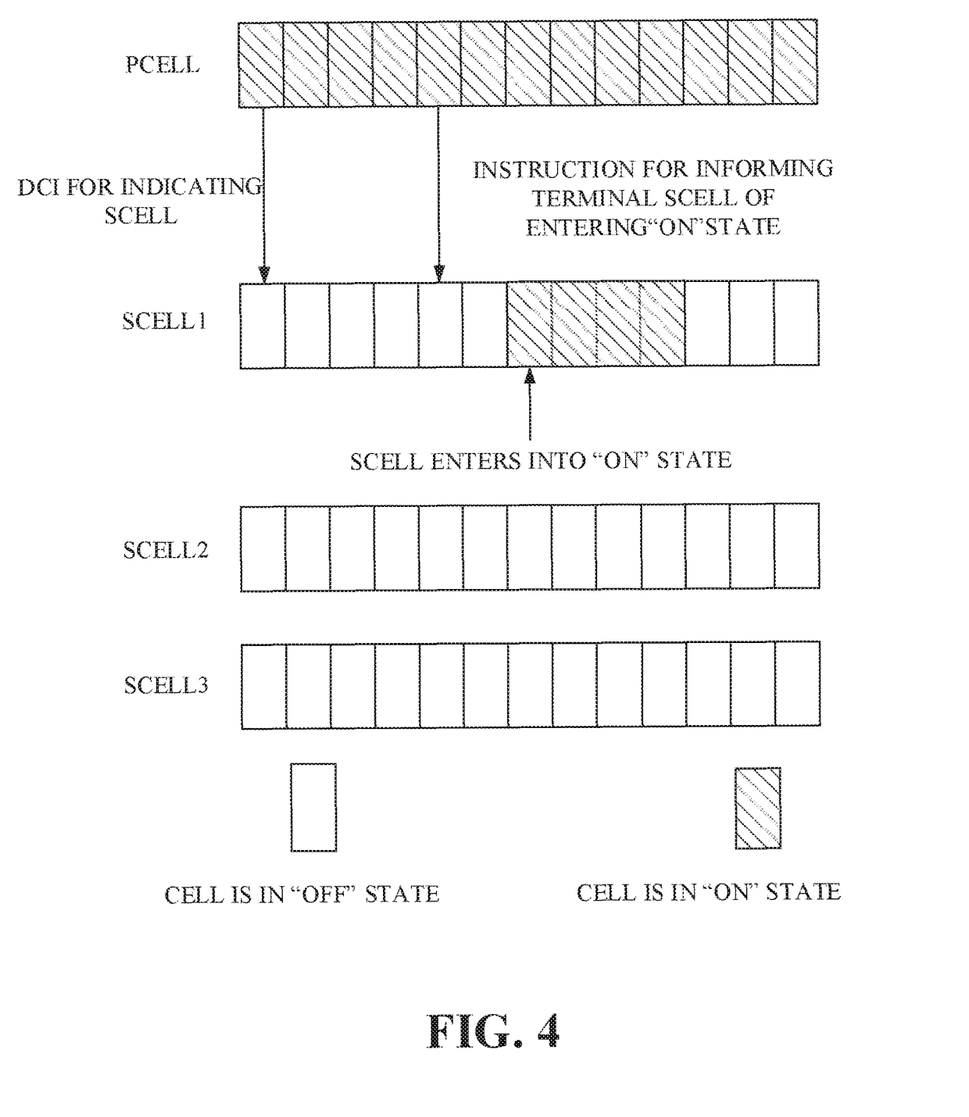
FIG. 4 is a schematic sub-frame structure diagram illustrating a sub-frame structure of physical layer downlink control information according to an implementation of the present disclosure.

As shown in FIG. 4, the duration (in the implementation as shown in FIG. 4, it is 4) of a new state of Scell and the start time point of state switching is informed to the terminal by Pcell via RRC signaling, MAC CE, or physical layer signaling. When the instruction notifying that Scell enters into "on" state is received by the terminal from Pcell, state information of Scell will be comprehended in accordance with the instruction.

It should be noted that FIG. 4 is just one example. For the same reason, all instruction information received by the terminal in the method can be sent by Scell, or sent by Pcell and Scell cooperatively.

Method 2: Pcell or Scell informs Scell of the new state duration and the start time point of state switching via state switching instruction. The difference between Method 1 and Method 2 is that, in Method 2, information indicating the new state duration and the start time point of state switching of Scell is included in the state switching instruction. The state switching instruction can be RRC signaling, MAC CE, or physical layer signaling.

Figure 5:
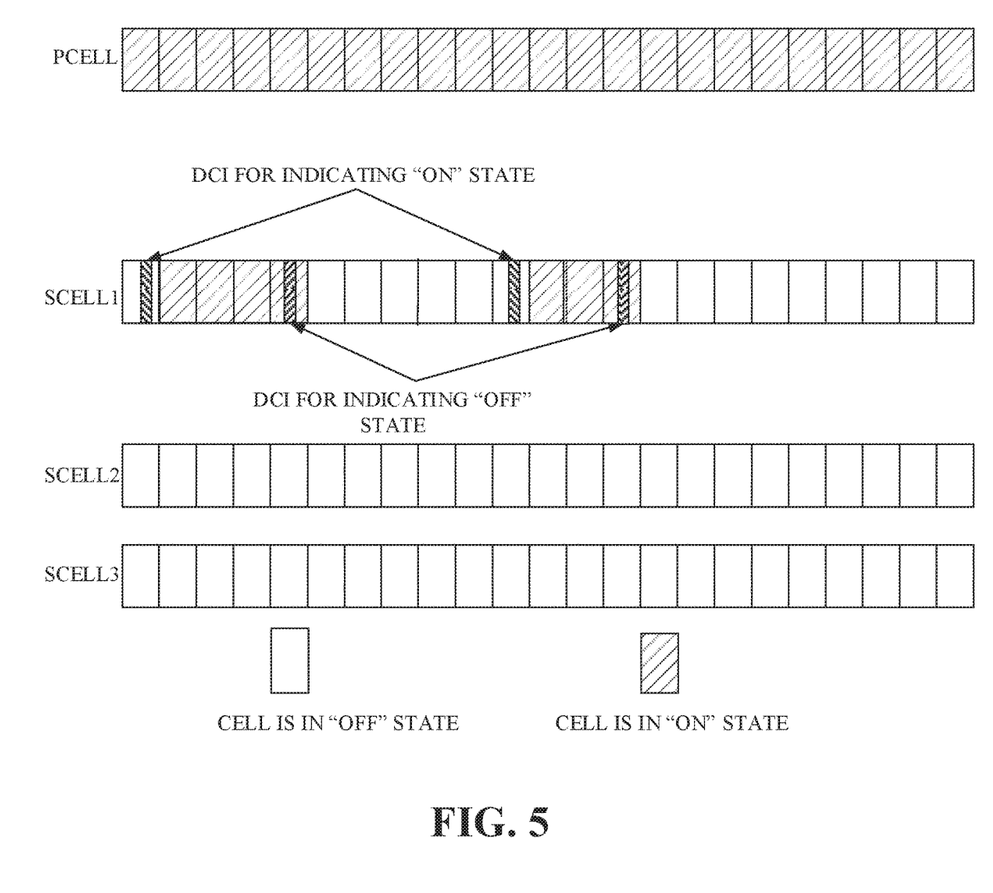
FIG. 5 is a schematic sub-frame structure diagram illustrating a sub-frame structure of physical layer downlink control information according to another implementation of the present disclosure.

Method 3: The terminal will not be informed of the new state duration of Scell, and the new state duration will be indicated implicitly via a state switching instruction. As shown in FIG. 5, the terminal receives physical layer signaling indicating "on" state on sub-frame n, and it is considered that Scell will enter into "on" state on sub-frame n+x1; the terminal receives physical layer signaling indicating "off" state on sub-frame n+x1+x2, and it is considered that Scell will enter into "off" state on sub-frame n+x1+x2+x3.

It should be noted that FIG. 5 is an exemplary diagram in which x1, x3 can be configured and informed to the terminal.

For the same reason, DCI (Downlink Control Information) shown in FIG. 5 can be RRC, MAC CE, etc., and DCI can be sent by Pcell.

Technical schemes of the present disclosure have been described in detail with refer to the accompanying drawings. The technical schemes are proposed for determining the duration of a rapid on/off state of a micro-cell base station, such that the terminal can know the duration of a current state of the micro-cell base station while know the current state of the micro-cell base station, thus avoid invalid detection and reduce the power consumption of the terminal.

It should be noted that, the method or the system of the present disclosure can be implemented through a hardware processor arranged in an apparatus. The hardware processor can execute program codes stored in a memory, or execute functional units provided in the system, so as to achieve the technical schemes of the present disclosure.

Figure 6:
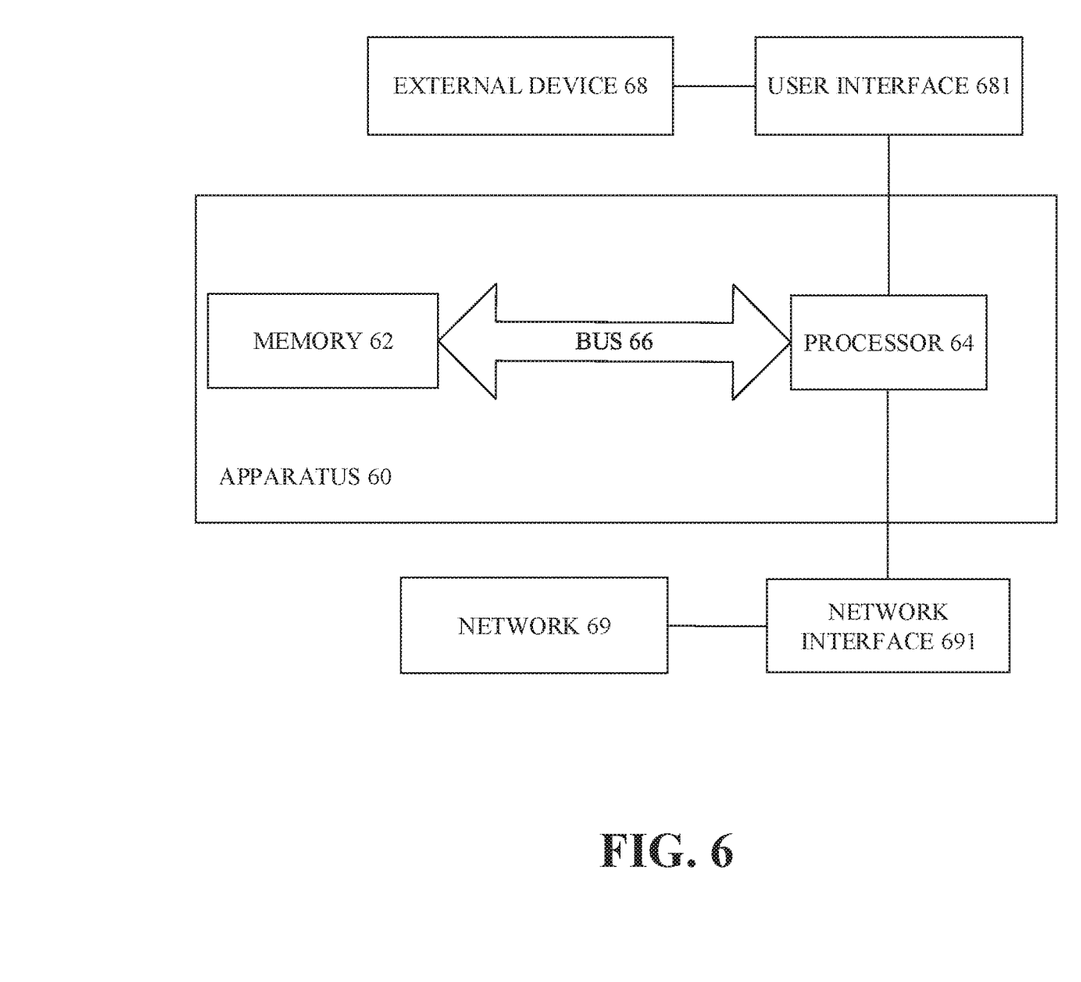
FIG. 6 is a block diagram illustrating an apparatus according to an implementation of the present disclosure.

Based on this, FIG. 6 illustrates an apparatus of the present disclosure. As shown in FIG. 6, the apparatus 60 includes a memory 62 and at least one processor 64 (for clarity, only one is illustrated in the figure). The memory 62 and the processor 64 can be connected in a wired or wireless manner, for example, through a bus 66.

To be specific, the memory 62 is configured to store computer-readable program code, and can be ROM, RAM, CD-RAM, or any other removable storage medium; the processor 64 is configured to invoke the computer-readable program code stored in the memory 62 to execute predetermined process such as the methods according to the implementations of the present disclosure described above, to avoid unnecessarily obscuring the present disclosure, the details of the methods or process is not provided here. In addition, as shown in FIG. 6, the processor 64 can but not necessarily connect to an external device 68 through a user interface 681 or to a network 69 through a network interface 691. Alternatively, the processor can also connect to the outside terminal or network in a wireless manner.

According to a further implementation of the disclosure, it is provided a computer-readable storage medium configured to store computer-readable program code, when executed on a data-processing apparatus, the program code is adapted to perform the methods as described in the above-mentioned implementations.

The computer-readable storage medium may be referred to as a non-volatile computer-readable storage medium or tangible computer-readable medium. Examples of computer-readable storage medium include but are not limited to: magnetic hard disk drive, solid state hard disk, flash memory, USB thumb drive, RAM, ROM, magneto-optical disk, and the register file of the processor.

The term computer readable-storage medium also refers to various types of recording media capable of being accessed by the computer device via a network or communication link. For example, data may be retrieved over a modem, over the internet, or over a local area network. References to a computer-readable storage medium should be interpreted as possibly being multiple computer-readable storage mediums. For example, the computer-readable storage medium can be multiple computer-readable storage medium within the same computer system, or, can be computer readable storage medium distributed among multiple computer systems or computing devices.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure should be included within the protection scope of the present disclosure.

What is claimed is:

1. A method for determining a duration of a rapid on/off state of a micro-cell base station, comprising:
    detecting in real-time an on/off state of a micro-cell base station to determine a state duration of the micro-cell base station, when the micro-cell base station is a single sub-frame level on/off micro-cell base station; and
    determining the state duration of the micro-cell base station by receiving a notification message sent by the micro-cell base station or a macro-cell base station, when the micro-cell base station is a multiple sub-frame level on/off micro-cell base station.

2. The method of claim 1, wherein the detecting in real-time the on/off state of the micro-cell base station to determine the state duration of the micro-cell base station comprises:
    determining whether physical layer downlink control information sent by at least one of the macro-cell base station and the micro-cell base station is received on each sub-frame;
    determining that the micro-cell base station is in an "on" state on a sub-frame, when the physical layer downlink control information sent by the at least one of the macro-cell base station and the micro-cell base station is received on the sub-frame;
    determining that the micro-cell base station is in an "off" state on the sub-frame, when the physical layer downlink control information sent by the at least one of the macro-cell base station and the micro-cell base station is not received on the sub-frame; and
    determining the state duration of the micro-cell base station in accordance with the state of the micro-cell base station on each sub-frame.

3. The method of claim 2, wherein the physical layer downlink control information comprises: physical layer downlink control information for cross-carrier scheduling, physical layer downlink control information for public information transmission scheduling, or physical layer downlink control information for UE-specific transmission scheduling.

4. The method of claim 1, wherein the detecting in real-time the on/off state of the micro-cell base station to determine the state duration of the micro-cell base station comprises:
    determining whether designated pilot information sent by the micro-cell base station is received on each sub-frame;
    determining that the micro-cell base station is in an "on" state on a sub-frame when the designated pilot information is detected on the sub-frame;
    determining that the micro-cell base station is in an "off" state on the sub-frame, when the designated pilot information is not detected on the sub-frame; and determining the state duration of the micro-cell base station in accordance with the state of the micro-cell base station on each sub-frame.

5. The method of claim 4, wherein
the micro-cell base station or the macro-cell base station is configured to send configuration information of the designated pilot information via radio resource control signaling, media access control signaling, or physical layer signaling; and
the configuration information includes time-frequency location of the designated pilot information and a type of the designated pilot information.

6. The method of claim 1, wherein the detecting in real-time the on/off state of the micro-cell base station to determine the state duration of the micro-cell base station comprises:
determining whether designated pilot information sent by the micro-cell base station is detected on each sub-frame, and whether each of the sub-frames is a sub-frame used to transmit a discovery signal;
determining that the micro-cell base station is in an "on" state on a sub-frame, when the designated pilot information is detected on the sub-frame and the sub-frame is not a sub-frame used to transmit the discovery signal;
determining that the micro-cell base station is in an "off" state on the sub-frame, when the designated pilot information is not detected on the sub-frame or the sub-frame is a sub-frame used to transmit the discovery signal; and
determining the state duration of the micro-cell base station in accordance with the state of the micro-cell base station on each sub-frame.

7. The method of claim 6, wherein the micro-cell base station or the macro-cell base station is configured to send information of the sub-frame used to transmit the discovery signal via radio resource control signaling, media access control signaling, or physical layer signaling.

8. The method of claim 1, wherein the determining the state duration of the micro-cell base station by receiving the notification message sent by the micro-cell base station or the macro-cell base station comprises:
prior to a state switching instruction of the micro-cell base station being received from the micro-cell base station or the macro-cell base station, receiving a start time point at which state switching is performed according to the state switching instruction of the micro-cell base station received from the micro-cell base station or the macro-cell base station, and the state duration of the micro-cell base station after the state switching.

9. The method of claim 1, wherein the determining the state duration of the micro-cell base station by receiving the notification message sent by the micro-cell base station or the macro-cell base station comprises:
receiving a state switching instruction of the micro-cell base station sent by the micro-cell base station or the macro-cell base station; and
parsing the state switching instruction to determine a start time point at which state switching of the micro-cell base station is performed and the state duration of the micro-cell base station after the state switching.

10. The method of claim 9, wherein the micro-cell base station or the macro-cell base station is configured to send the state switching instruction via radio resource control signaling, media access control signaling, or physical layer signaling.

11. The method of claim 1, wherein the determining the state duration of the micro-cell base station by receiving the notification message sent by the micro-cell base station or the macro-cell base station comprises:
receiving a state switching instruction of the micro-cell base station sent by the micro-cell base station or the macro-cell base station;
determining a location of a second sub-frame at which state switching of the micro-cell base station is performed, according to a location of a first sub-frame at which the state switching instruction received is located and a predefined first adjustment value;
determining a location of a fourth sub-frame at which the state switching of the micro-cell base station is performed, according to a location of a third sub-frame at which a state switching instruction sent again is located and a predefined second adjustment value, upon reception of the state switching instruction sent again by the micro-cell base station or the macro-cell base station; and
determining the state duration according to the location of the second sub-frame and the location of the fourth sub-frame.

12. A system for determining a duration of a rapid on/off state of a micro-cell base station, comprising a hardware processor configured to execute the following program units:
a detecting unit, configured to detect in real-time an on/off state of a micro-cell base station when the micro-cell base station is a single sub-frame level on/off micro-cell base station;
a receiving unit, configured to receive a notification message sent by the micro-cell base station or a macro-cell base station when the micro-cell base station is a multiple sub-frame level on/off micro-cell base station; and
a processing unit, configured to determine a state duration of the micro-cell base station according to the on/off state of the micro-cell base station detected in real-time by the detecting unit, or the notification message sent by the micro-cell base station or the macro-cell base station and received by the receiving unit.

13. The system of claim 12, wherein the hardware processor is configured to execute the following program units included in the processing unit:
a judging unit, configured to
judge whether physical layer downlink control information sent by any of the macro-cell base station and the micro-cell base station is received on each sub-frame,
determine that the micro-cell base station is in an "on" state on a sub-frame when the physical layer downlink control information is received on the sub-frame, and
determine that the micro-cell base station is in an "off" state on the sub-frame, when the physical layer downlink control information is not received on the sub-frame; and
a determining unit, configured to determine the state duration of the micro-cell base station in accordance with the state of the micro-cell base station on each sub-frame.

14. The system of claim 13, wherein the physical layer downlink control information comprises: physical layer downlink control information for cross-carrier scheduling, physical layer downlink control information for public information transmission scheduling, or physical layer downlink control information for UE-specific transmission scheduling.

15. The system of claim 12, wherein the hardware processor is configured to execute the following program units included in the processing unit:
  a judging unit, configured to
    judge whether designated pilot information sent by the micro-cell base station is received on each sub-frame,
    determine that the micro-cell base station is in an "on" state on a sub-frame when the designated pilot information is detected on the sub-frame, and
    determine that the micro-cell base station is in an "off" state on the sub-frame when the designated pilot information is not detected on the sub-frame; and
  a determining unit, configured to determine the state duration of the micro-cell base station in accordance with the state of the micro-cell base station on each sub-frame.

16. The system of claim 12, wherein the hardware processor is configured to execute the following program units included in the processing unit:
  a judging unit, configured to
    judge whether designated pilot information sent by the micro-cell base station is detected on each sub-frame, and whether each of the sub-frames is a sub-frame used to transmit a discovery signal,
    when the designated pilot information is detected on a sub-frame and the sub-frame is not a sub-frame used to transmit the discovery signal, determine that the micro-cell base station is in an "on" state on the sub-frame, and
    when the designated pilot information is not detected on the sub-frame or the sub-frame is a sub-frame used to transmit the discovery signal, determine that the micro-cell base station is in an "off" state on the sub-frame; and
  a determining unit, configured to determine the state duration of the micro-cell base station in accordance with the state of the micro-cell base station on each sub-frame.

17. The system of claim 12, wherein the hardware processor is configured to execute the receiving unit to receive a start time point at which state switching is performed according to a state switching instruction of the micro-cell base station received from the micro-cell base station or the macro-cell base station, and the state duration of the micro-cell base station after the state switching.

18. The system of claim 12, wherein
  the hardware processor is configured to execute the receiving unit to receive a state switching instruction of the micro-cell base station sent by the micro-cell base station or the macro-cell base station; and
  the hardware processor is configured to execute the following program units included in the processing unit:
    a parsing unit, configured to parse the state switching instruction; and
    a determining unit, configured to determine a start time point at which state switching of the micro-cell base station is performed, and the state duration of the micro-cell base station after the state switching according to a parsing result of the parsing unit.

19. The system of claim 18, wherein the micro-cell base station or the macro-cell base station is configured to send the state switching instruction via radio resource control signaling, media access control signaling, or physical layer signaling.

20. The system of claim 12, wherein
  the hardware processor is configured to execute the receiving unit to receive a state switching instruction of the micro-cell base station sent by the micro-cell base station or the macro-cell base station; and
  the hardware processor is configured to execute the processing unit to:
    determine a location of a second sub-frame at which state switching of the micro-cell base station is performed, according to a location of a first sub-frame at which the state switching instruction received by the receiving unit is located and a predefined first adjustment value;
    determine a location of a fourth sub-frame at which the state switching of the micro-cell base station is performed, according to a location of a third sub-frame at which a state switching instruction sent again is located and a predefined second adjustment value, when the state switching instruction sent again by the micro-cell base station or the macro-cell base station is received by the receiving unit; and
    determine the state duration of the micro-cell base station according to the location of the second sub-frame and the location of the fourth sub-frame.

* * * * *